(12) United States Patent
Kashchenevsky

(10) Patent No.: US 6,419,394 B1
(45) Date of Patent: Jul. 16, 2002

(54) METHOD AND DEVICE TO CONTROL THE MOVEMENT ACCURACY OF A UNIT MOVING LINEARLY ON HYDRO (AIR) STATIC SLIDES

(75) Inventor: Leonid Kashchenevsky, Stratford, CT (US)

(73) Assignee: Moore Tool Company Incorporated, Bridgeport, CT (US)

( * ) Notice: Subject to any disclaimer, the term of this patent is extended or adjusted under 35 U.S.C. 154(b) by 0 days.

(21) Appl. No.: 09/638,925

(22) Filed: Aug. 15, 2000

(30) Foreign Application Priority Data

Aug. 30, 1999 (IL) .................................................. 131647

(51) Int. Cl.[7] .............................................. F16C 32/06
(52) U.S. Cl. ...................................................... 384/12
(58) Field of Search ..................................... 384/12, 100

(56) References Cited

U.S. PATENT DOCUMENTS

| | | | | |
|---|---|---|---|---|
| 3,442,560 A | * | 5/1969 | De Gast | 384/12 |
| 3,635,532 A | * | 1/1972 | Zerbola | 384/12 |
| 4,653,408 A | * | 3/1987 | Nagashima et al. | 384/12 X |
| 5,104,237 A | * | 4/1992 | Slocum | 384/12 |
| 5,484,208 A | * | 1/1996 | Kane et al. | 384/12 |

\* cited by examiner

*Primary Examiner*—Thomas R. Hannon
(74) *Attorney, Agent, or Firm*—Bachman & LaPointe, P.C.

(57) ABSTRACT

A method and device for simultaneous compensation of five existing components of deviation from the ideal linear motion of solid unit moving hydro (air) static slides and using five independent flow control valves whose valves connections to the recesses and commutations between recesses are made in such a way that every valve is responsible for compensation only for one component of deviation.

10 Claims, 5 Drawing Sheets

METHOD AND DEVICE TO CONTROL THE MOVEMENT ACCURACY OF A UNIT MOVING LINEARLY ON HYDRO (AIR) STATIC SLIDES

BACKGROUND OF THE INVENTION

The present invention relates to a method and a device for controlling the accuracy of the movement of a unit which moves on slides, such as a table moving on hydro or air static slides.

Every solid unit moving in a linear direction has the potential to make five independent types of errors which are defined by the accuracy of the slides on which the unit moves and these errors depend on the movement's coordinate.

If a unit is moving in the Z direction (see FIG. 1), there are five possible components of deviation from the ideal straight motion. They are:

$\Delta x(z)$—linear deviation in x-direction;

$\Delta y(z)$—linear deviation in y-direction;

$\Delta\alpha(z)$—angle deviation when the unit rotates around the axis x;

$\Delta\beta(z)$—angle deviation when the unit rotates around the axis y;

$\Delta\gamma(z)$—angle deviation when the unit rotates around the axis Z.

U.S. Pat. No. 4,653,408 shows one way to control the attitude of a table that is moving on hydrostatic slides. The main defects of this way are (a) it is possible to compensate only the attitudes of linear deviation and (b) the compensation of linear deviations will change the uncontrolled angle deviations.

SUMMARY OF THE INVENTION

It is proposed herein to provide a simple method and device for the simultaneous and independent compensation for all five possible error components. This method can be used both for special designed new slides and for correcting the movement of existing slides.

Because five independent components of the total error have to be controlled, the device of the present invention has five independent valves and every valve changes the flow of a fluid, such as oil or air, independently from the other valves. The valves are connected to the recesses and the commutations between the recesses in such a way that every valve is responsible only for compensation of one component of the total error and a change of flow through a respective valve will not be an influence on the four other components of the total error.

The method of the present invention very easily improves the accuracy of a moving unit, such as a table, which moves on slides. The method involves measuring, one by one, all five components of the total error or five independent functions of these components and after every measurement adjusting each valve that is responsible for each respective component of the total error until the error is eliminated. As previously discussed, the adjustment of each valve is independent from the adjustments for the other four valves. Using the method of the present invention, if some independent units are moving in linear directions, the same method can be used both to make the movements really straight and to achieve the required accuracy for the angles between the directions of the unit's movements.

The only alternative to the method of the present invention is the hand scrapping of slides according to measurements of a table's movement. Hand scrapping is widely used for all types of high precision and ultra precision machine tools and for three-coordinate measuring machines as well. The method of the present invention is much cheaper, shorter, and more accurate compared with the hand scrapping of the slides. Additionally, it allows one to correct the movement's accuracy directly in the customer's shop after a machine is finally installed in a steady position.

Other details of the method and device of the present invention, as well as other advantages and objects attendant thereto, will become more apparent from the following detailed description and the accompanying drawings, wherein like reference numerals depict like elements.

DETAILED DESCRIPTION OF THE PREFERRED EMBODIMENT(S)

Figure 1:
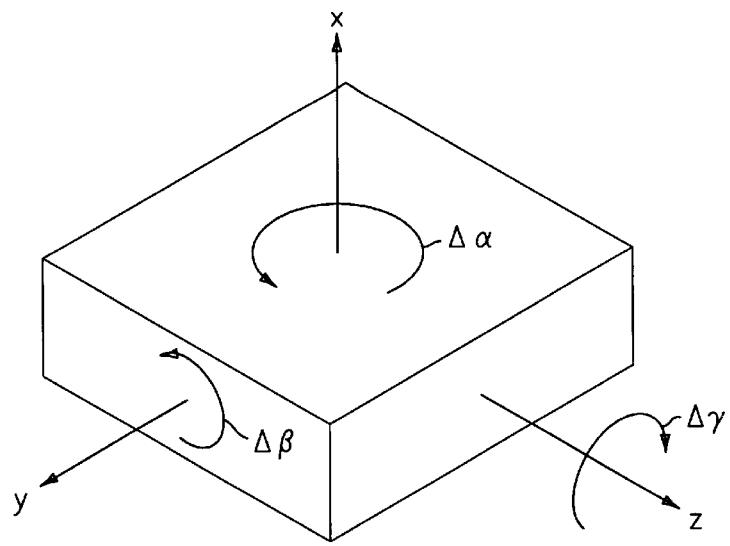
FIG. 1 shows schematically the directions of linear and angular deviations associated with five independent errors of movement of a unit moving along axis Z.
Figure 2A:
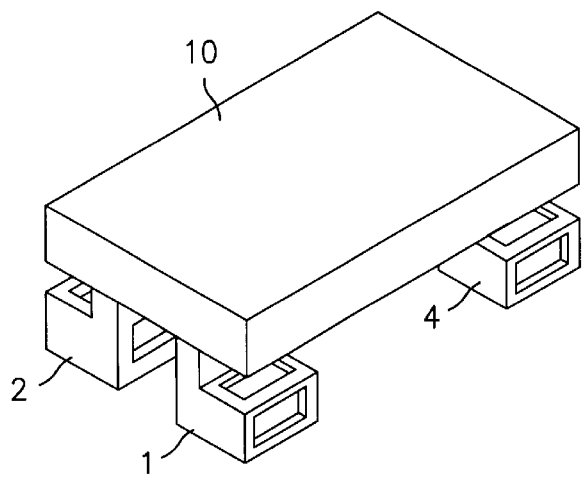
FIGS. 2a and 2b are respectively isometric and top views of a machine table movable on slides.
Figure 2B:
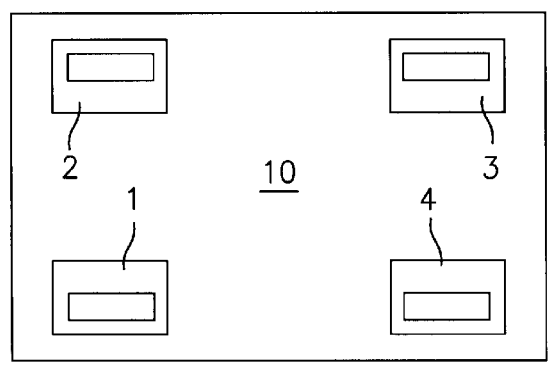
Figure 3:
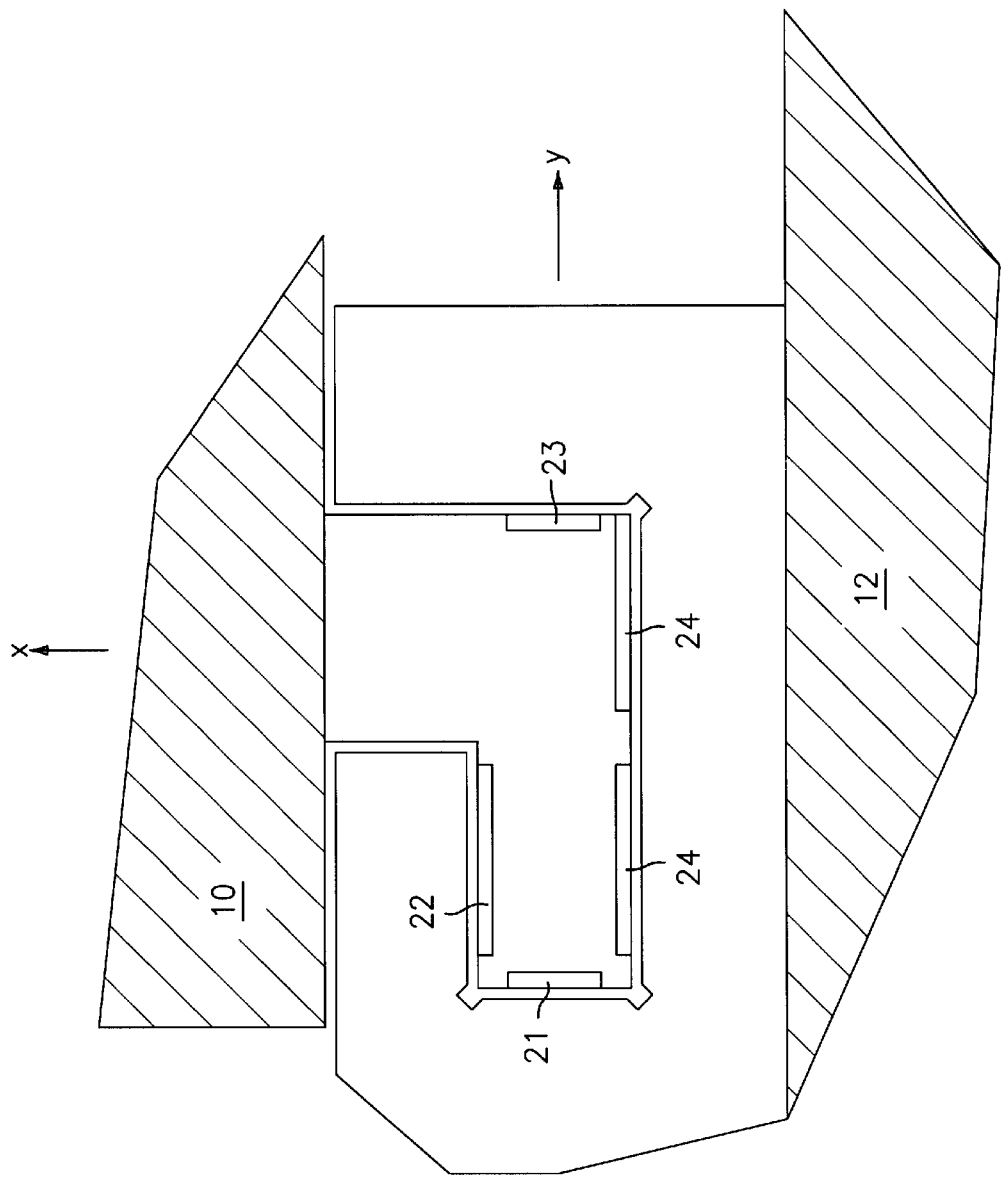
FIG. 3 is an enlarged cross sectional view of the machine table of FIGS. 2a and 2b.

Referring now to FIG. 2, the table 10 contains four independent pads 1–4. As shown in FIG. 3, each of the pads 1–4 contains four recesses. Recesses 21 and 23 restrict the table 10 in the Y direction and recesses 22 and 24 restrict the table 10 in the X direction. The table 10 is moving along a base 12 in the Z direction which is perpendicular to the plane of FIG. 3. If one changes the flows to the recesses 21 and 23 for the pads 1–4, the table 10 will change its position only in the plane Z-Y. If one changes the flows to the recesses 22 and 24 for the pads 1–4, the table 10 will change its position in the planes X-Z and X-Y.

Figure 4A:
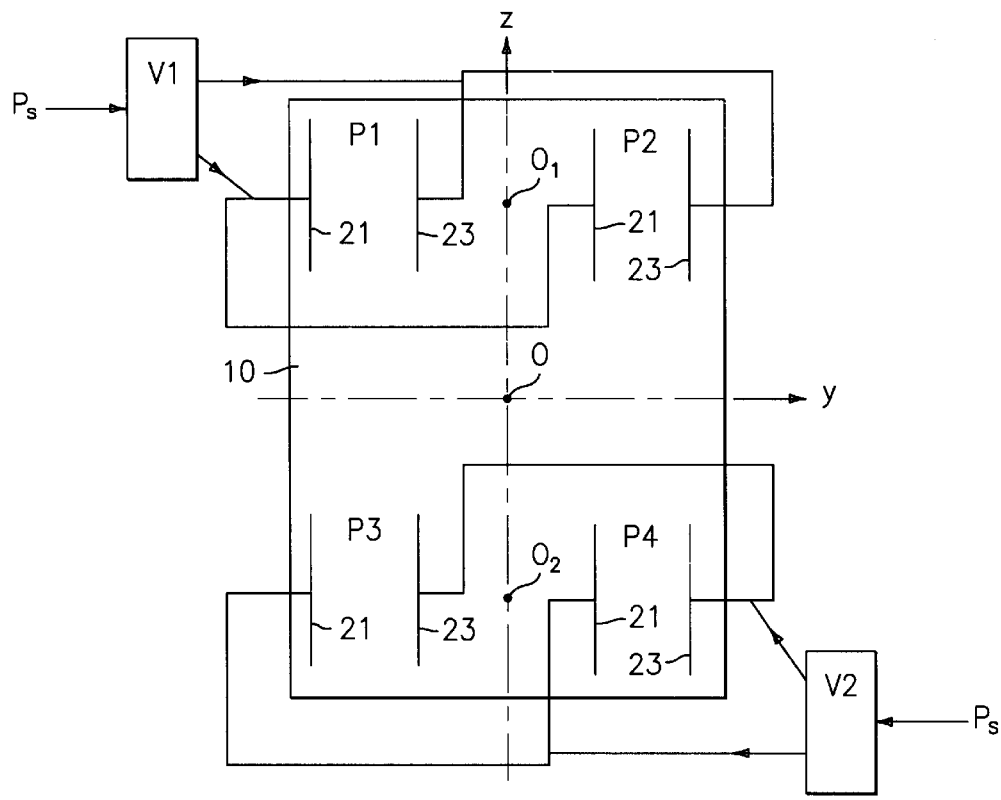
FIGS. 4a and 4b and 5a and 5b depict schematically commutations of control valves and recesses in accordance with the present invention.

FIG. 4a illustrates one way for commutations between the recesses 21–24 on the pads P1–P4 and the connections of control valves V1–V5 to the recesses to provide independent control of the table 10 movement's accuracy in the plane Y-Z. The left recess 21 of the pad P1 is connected to the left recess 21 of the pad P2 and the right recess 23 of the pad P1 is connected to the right recess 23 of the pad P2. Further, the left recess 21 of pad P3 is connected to the left recess 21 of pad P4 and the right recess 23 of pad P3 is connected to the right recess 23 of pad P4.

Figure 4B:
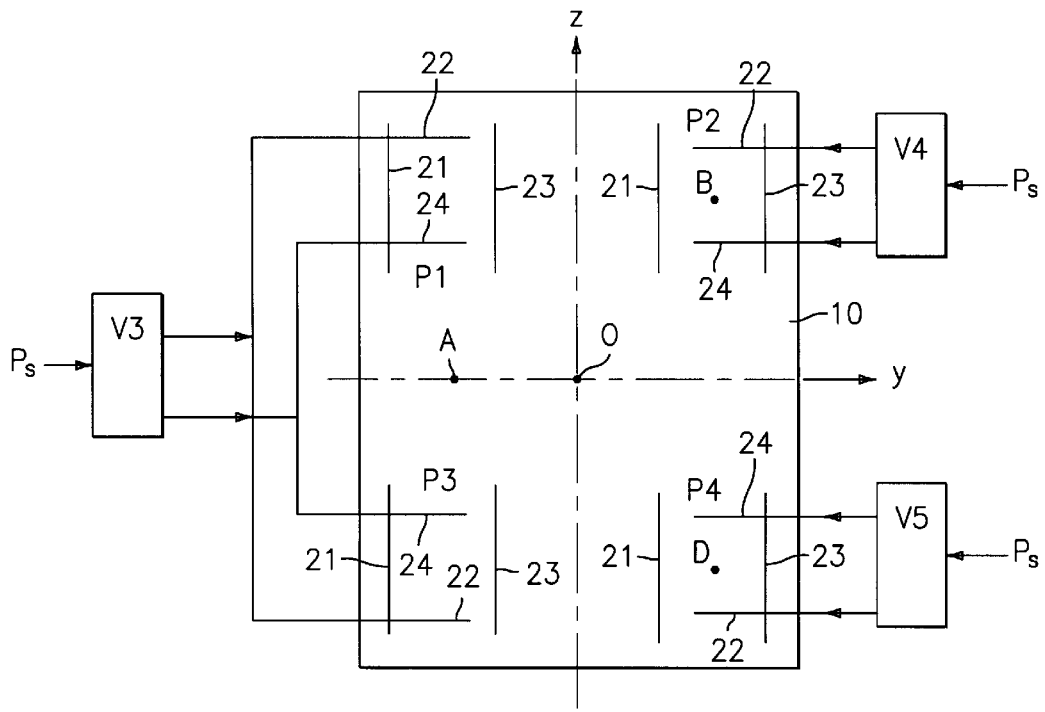
Figure 6:
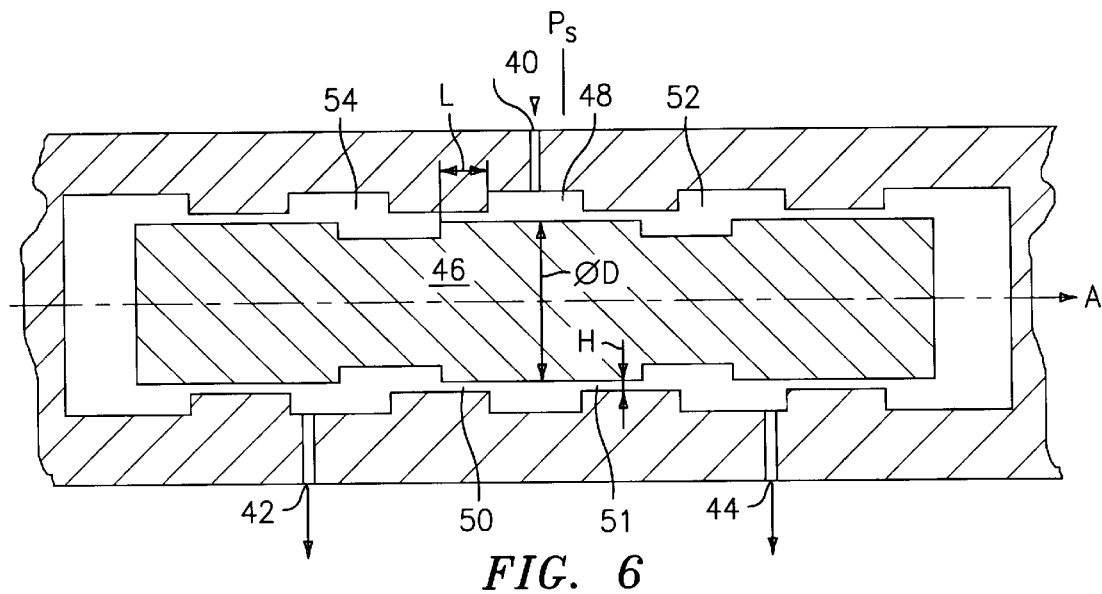
FIG. 6 is a cross sectional view of a control valve.
Figure 7:
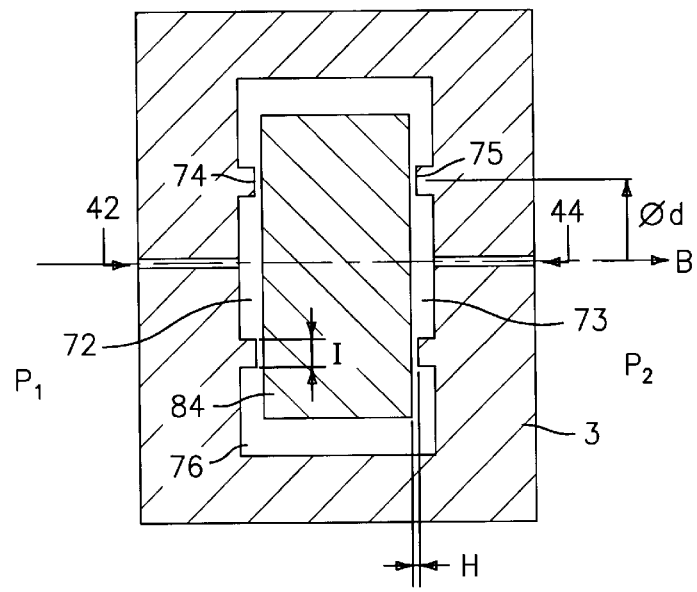
FIG. 7 schematically represents the flow of fluid from a valve to a pocket or recess.

The valves V1–V5 shown in FIGS. 4a and 4b are constructed as follows. Referring now to FIGS. 6 and 7, each valve has an inlet 40 that is connected to an oil supply source with a constant pressure Ps and two outlets 42 and 44. Further, each valve has a shaft 46 movable in two directions along an axis A. When the shaft of the valve V1–V5 is in a central position, the flow rates through the two outlets 42 and 44 are equal one to another. When the shaft is moved from the central position, the flow rate in one of the outlets 42 and 44 increases while the flow rate in the other of the outlet 42 and 44 decreases. That is, the high pressure Ps coming from the external pressure supply unit to the cylindrical groove 48 passes through clearances 50 and 51 to the cylindrical grooves 52 and 54 that are connected directly to thrust pockets of the bearings. When the valve's shaft 46 is in the central position both inlet restrictors (clearances 50 and 51) are equal one to another and therefore a supported unit will be in the central position as well.

If the shaft 46 is moved in the positive direction A, the hydraulic resistance of the gap 51 becomes bigger (the length of the gap is increasing) and the hydraulic resistance of the gap 50 becomes smaller. As a result, the flow to a first recess of a pad is increasing and the flow to a second recess of a pad is decreasing. The pressure in the first recess will be bigger than the pressure in the second recess and the pad will be moved in a positive direction to the new steady state position when pressures from the both sides will be equal.

To find the transfer function, one must first write the flow balance equations: the oil's flow that is coming to the recess or pocket 72 has to be equal to the flow that is leaving this pocket to the space 76. The same is for the all pocket 73.

$$\frac{Ps - P_1}{R_1} = \frac{P_1}{r_1}; \frac{P_s - P_2}{R_2} = \frac{P_2}{r_2} \quad (1)$$

where: $P_1$ is the pressure in the pocket 72 and in the groove 54 and $P_2$ is a pressure in the pocket 73 and in the groove 52; $R_1$ is hydraulic resistance of the gap 50 and $R_2$ is hydraulic resistance of the gap 51; $r_1$ is hydraulic resistance of the gap 74 and $r_2$ is hydraulic resistance of the gap 75.

For the laminar flow we have the next expressions for the hydraulic resistance of the gaps.

$$\frac{1}{R_1} = \frac{\pi_1 DH^3}{12\mu(L-y)}; \frac{1}{r_1} = \frac{\pi_1 d(h+x)^3}{12\mu l}; \quad (2)$$

$$\frac{1}{R_2} = \frac{\pi_1 DH^3}{12\mu(L+y)}; \frac{1}{r_2} = \frac{\pi_1 d(h-x)^3}{12\mu l}, \quad (3)$$

where D is diameter of the shaft 46; L is the length of the gaps 50 and 51 when the shaft is in the central position; H is the clearance in the gaps 50 and 51; d is average diameter of the gaps 73 and 74; l is the length of the gaps 73 and 74; h is the clearance in the gaps 73 and 74 when the unit 84 is in the central position; y is the shaft's movement in the positive direction A; x is the supported unit's movement in the positive direction B. Putting (2) and (3) into (1), we get the equations:

$$P_1 \left[ \frac{DH^3}{L-y} + \frac{d(h+x)^3}{l} \right] = Ps \frac{DH^3}{L-y}; \quad (4)$$

$$P_2 \left[ \frac{DH^3}{L+y} + \frac{d(h-x)^3}{l} \right] = Ps \frac{DH^3}{L+y}; \quad (5)$$

If one changes the variables x and y to dimensionless $\bar{x}$ and $\bar{y}$:

$$\bar{y} = \frac{y}{L}; \bar{x} = \frac{x}{h} \quad (6)$$

Then we get from equations (4) and (5):

$$P_1 \left[ \frac{DH^3}{L} \cdot \frac{1}{1-\bar{y}} + \frac{dh^3}{l}(1+\bar{x})^3 \right] = Ps \frac{DH^3}{L} \frac{1}{1-\bar{y}} \quad (7)$$

$$P_2 \left[ \frac{DH^3}{L} \cdot \frac{1}{1+\bar{y}} + \frac{dh^3}{l}(1-\bar{x})^3 \right] = Ps \frac{DH^3}{L} \frac{1}{1+\bar{y}} \quad (8)$$

When the shaft and the supported unit are in the central position the pressures in the pockets have to be equal to half of supply pressure Ps (to get the maximal bearings stiffness)

$$P_1 = P_2 = \tfrac{1}{2} Ps \quad (9)$$

Therefore, when x=y=0 we get:

$$\frac{1}{2} Ps \left( \frac{DH^3}{L} + \frac{dh^3}{l} \right) = Ps \frac{DH^3}{L} \text{ or} \quad (10)$$

$$\frac{DH^3}{L} = \frac{dh^3}{l}$$

Now equations (7) and (8) can be written as:

$$P_1 \left[ \frac{1}{1-\bar{y}} + (1+\bar{x})^3 \right] = Ps \frac{1}{1-\bar{y}} \quad (11)$$

$$P_2 \left[ \frac{1}{1+\bar{y}} + (1-\bar{x})^3 \right] = Ps \frac{1}{1+\bar{y}} \quad (12)$$

Because the position is steady $P_1 = P_2$. Therefore:

$$\frac{Ps}{1+(1-\bar{y})(1+\bar{x})^3} = \frac{Ps}{1+(1+\bar{y})(1-\bar{x})^3} \text{ or} \quad (13)$$

$$\left( \frac{1+\bar{x}}{1-\bar{x}} \right)^3 = \frac{1+\bar{y}}{1-\bar{y}} \quad (14)$$

Finally we obtain the next connection between movement of supported unit x and the movement of the valve's shaft y $$\bar{x} = \frac{(1+\bar{y})^{\frac{1}{3}} - (1-\bar{y})^{\frac{1}{3}}}{(1+\bar{y})^{\frac{1}{3}} + (1-\bar{y})^{\frac{1}{3}}} \quad (15)$$

To calculate the stiffness, let's say that the valve's shaft displacement is $y_o$. Then the steady position of the supported unit will be:

$$\bar{x}_o = \frac{(1+\bar{y}_o)^{\frac{1}{3}} - (1-\bar{y}_o)^{\frac{1}{3}}}{(1+\bar{y}_o)^{\frac{1}{3}} + (1-\bar{y}_o)^{\frac{1}{3}}} \quad (15a)$$

Let's say that there is a force G applied to the supported unit 84 in the negative direction of the X. We have from the conditions of the force balance:

$$(P_1 - P_2)S = G \quad (16)$$

From (11) and (12), we obtain the equation:

$$PsS \left[ \frac{1}{1+(1-\bar{y})(1+\bar{x})^3} - \frac{1}{1+(1+\bar{y})(1-\bar{x})^3} \right] = G \quad (17)$$

Let's say that because of the force G the supported unit is moved from initial position $x_o (x_o = \bar{x}_o \cdot h)$ on the distance −e.

$$\bar{x} = \bar{x}_o - \varepsilon; \quad \varepsilon = \frac{e}{h} \qquad (18)$$

Putting equation (18) in equation (17) we get:

$$\frac{1}{1+(1-\bar{y}_o)(1+\bar{x}_o-\varepsilon)^3} - \frac{1}{1+(1+\bar{y}_o)(1-\bar{x}_o+\varepsilon)^3} = \frac{G}{P_sS} \qquad (19)$$

In the linear approximation by $\varepsilon$ we get:

$$\frac{1}{1+(1-\bar{y}_o)(1+\bar{x}_o)^3} + 3\varepsilon \frac{(1-\bar{y}_o)(1+\bar{x}_o)^2}{[1+(1-\bar{y}_o)(1+\bar{x}_o)^3]^2} - \qquad (20)$$

$$\frac{1}{1+(1+\bar{y}_o)(1-\bar{x}_o)^3} + 3\varepsilon \frac{(1+\bar{y}_o)(1-\bar{x}_o)^3}{[1+(1+\bar{y}_o)(1-\bar{x}_o)^3]^2} = \frac{G}{P_sS}$$

But according to equation (13) we have:

$$\frac{1}{1+(1-\bar{y}_o)(1+\bar{x}_o)^3} = \frac{1}{1+(1+\bar{y}_o)(1-\bar{x}_o)^3} \qquad (21)$$

Therefore we obtain the relationship between external force G and the unit's movement $\varepsilon$ in dependence from the coordinate $x_o$ of the steady position $$\frac{G}{P_sS} = 3\varepsilon \left\{ \frac{(1-\bar{y}_o)(1+\bar{x}_o)^2}{[1+(1-\bar{y}_o)(1+\bar{x}_o)^3]^2} + \frac{(1+\bar{y}_o)(1-\bar{x}_o)^2}{[1+(1+\bar{y}_o)(1-\bar{x}_o)^3]^2} \right\} \qquad (22)$$

For the stiffness c we have:

$$c = \qquad (23)$$

$$\frac{1}{h}\frac{dG}{d\varepsilon} = \frac{3P_sS}{2h}\left\{ \frac{(1-\bar{y}_o)(1+\bar{x}_o)^2}{[1+(1-\bar{y}_o)(1+\bar{x}_o)^3]^2} + \frac{(1+\bar{y}_o)(1-\bar{x}_o)^2}{[1+(1+\bar{y}_o)(1-\bar{x}_o)^3]^2} \right\}$$

Because according to equation (21) $1+(1-\bar{y}_o)(1+\bar{x}_o)^3 = 1+(1+\bar{y}_o)(1-\bar{x}_o)^3$ we obtain $$c = \frac{3P_sS}{2h} \cdot \frac{4(1-\bar{x}_o\bar{y}_o+\bar{x}_o^2)}{[1+(1+\bar{y}_o)(1-\bar{x}_o)^3]^2} \equiv \frac{3P_sS}{2h} \cdot Z(\bar{x}_o, \bar{y}_o) \qquad (24)$$

The function $Z(\bar{x}_o, \bar{y}_o)$ is responsible for stiffness deviation from its number when the shaft is placed in the central position $c_o$ $$c_o = \frac{3P_sS}{2h} \qquad (25)$$

For the function z we have the following table

| y = 0.1 | x = 0.033 | z = 1.003 |
| --- | --- | --- |
| 0.2 | 0.067 | 1.017 |
| 0.3 | 0.103 | 1.043 |
| 0.4 | 0.140 | 1.078 |
| 0.5 | 0.181 | 1.133 |
| 0.6 | 0.227 | 1.211 |
| 0.7 | 0.281 | 1.325 |
| 0.8 | 0.350 | 1.509 |
| 0.9 | 0.454 | 1.861 |

As we can see from the foregoing, the stiffness is continuously growing when supported unit is moving from the central position.

In FIG. 4a, the outlets of the valve V1 are respectively connected to the left and right recesses of the pads P1 and P2. If the shaft of the valve V1 is moved in a first direction, the flows to the left recesses of the pads P1 and P2 increase, while the flows in the right recesses of these pads decreases. When the shaft is moved in the opposite direction, the flows to the left recesses of pads P1 and P2 decrease, while the flows to the right recesses of pads P1 and P2 increases. As a result of the shaft's movement in either direction, the table 10 will start to rotate around the point $O_2$, either in a clockwise direction or a counterclockwise direction.

Valve V2 has a construction identical to valve V1; however, the outlets of valve V2 are respectively connected to the left and right recesses of pads P3 and P4. If the shaft (not shown) of valve V2 is moved in one direction, the flows to the left recesses will increase, while the flows to the right recesses will decrease. If the shaft of the valve V2 is moved in the opposite direction, the flows to the left recesses will decrease, while the flows to the right recesses will decrease. Thus, when the shaft of the valve V2 moves, the table 10 will rotate around the point $O_1$. Because of this relationship between the recesses, the couple of pads P1 and P2 has zero stiffness against table rotation around the point $O_1$ and, respectively, the couple of pads P3 and P4 has zero stiffness against table rotation around the point $O_2$.

To compensate for the table movement's errors in the plane Y-Z, the movements of points $O_1$ and $O_2$ in the Y direction are measured in dependence of coordinate Z. The errors are compensated for by respective control movements of the shafts of valves V1 and V2. The valve V1 does not change the table's Y coordinate in the point $O_2$ and, respectively, the valve V2 does not change the Y coordinate of the table in point $O_1$.

In FIG. 4b, there is represented the recesses commutation and the valves connections to these recesses to provide the independent compensations for the table movement's errors in the planes Y-Z and X-Y. The valves V3, V4 and V5 have the same construction as valves V1 and V2. Each is connected to the supply source with the constant pressure Ps and has two outlets connected to respective recesses. As shown in FIG. 4b, the lower recess 24 of the pad P1 is connected to the lower recess 24 of the pad P3 and the upper recess 22 of the pad P1 is connected to the upper recess 22 of the pad P3. The two outlets of the valve V3 are connected to the lower and upper recesses 24 and 22 respectively of the pads P1 and P3.

The outlets of the valve V4 are connected to the lower and upper recesses 24 and 22 respectively of the pad P2 and the outlets of the valve V5 are connected in the same way to the recesses 24 and 22 of the pad P4.

The point B shows the centers of the lower and upper recesses of the pad P2 and the point D shows the centers of the lower and upper recesses for the pad P4. The point A is positioned at the middle of a line extending between the centers of the recesses 22 and 24 for the pads P1 and P3. If the shaft of the valve V3 moves, the table 10 will start to rotate in the plane X-Y around the line B-D that connects the centers of the recesses 22 and 24 of pads P2 and P4. If the shaft of valve V4 is moved, the table 10 will start to rotate around the line A-D and if the shaft of the valve V5 is moved, the table 10 will start to rotate around the line A-B. This means that the points B and D will not move if the shaft of valve V3 is moving. Respectively, the points A and D will not move if the shaft of the valve V4 is moved. Therefore, it is possible to make consequent independent compensation for points A, B and D movements in the X direction by control of the compensating movement of the shafts for valves V3–V5.

Figure 5A:
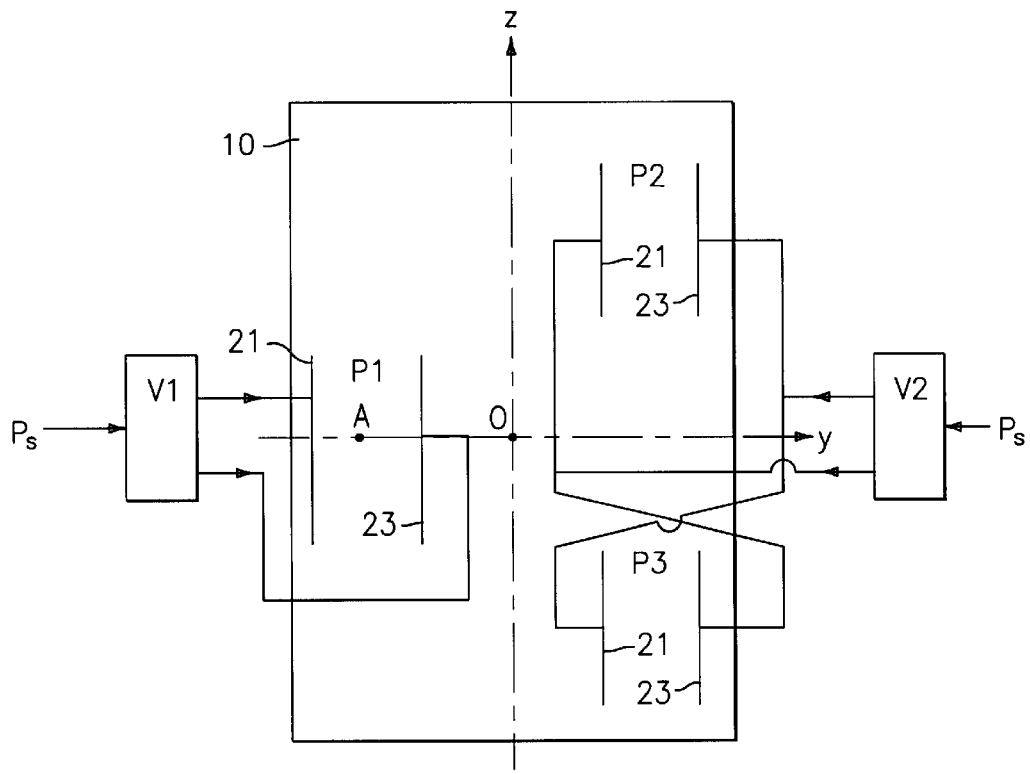
Figure 5B:
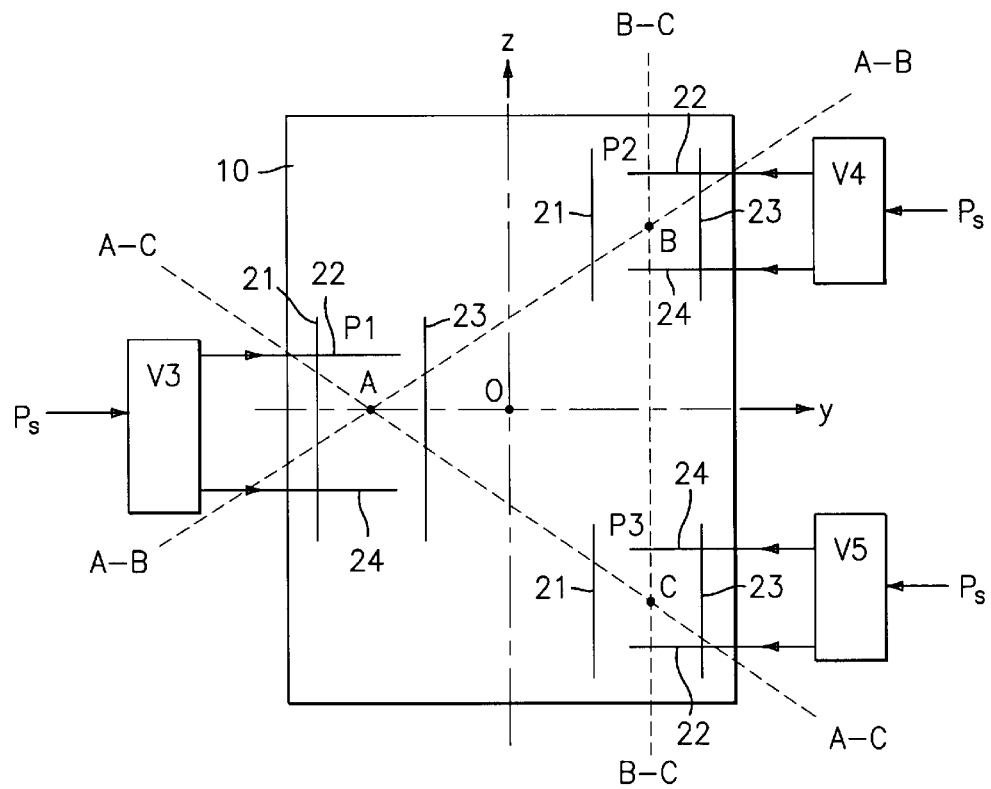

In FIGS. 5a and 5b, there is represented an alternative approach to compensate for the errors when the table 10 is moving on three pads. Valves V1–V5 have the construction previously discussed. Exactly like explained above, the table's movements in the Y-Z plane and in the X-Z and Y-Z planes will be examined separately. In FIG. 5a, there is represented a recesses commutation and valves V1 and V2 connection to the recesses 21 and 23 of pads P1–P3 to provide the independent control for the table's errors in the plane Y-Z. When the shaft of the valve V1 is moved, the table 10 is moved linearly in the Y direction because the couple of pads P2 and P3 has a zero stiffness in the Y direction. When the shaft of the valve V2 is moved, the table 10 rotates around the point A—the center of the recesses 21 and 23 of pad P1.

Referring now to FIG. 5b, the three valves V3–V5 are connected to the recesses 22 and 24 of pads P1–P3 with each valve being connected to the recesses 22 and 24 of one of the pads. Point A is the center of the recesses 22 and 24 of pad P1; point B is the center of the recesses 22 and 24 of pad P2; and point C is the center of the recesses 22 and 24 of pad P3. When the shaft of valve V3 is moved, the table 10 rotates around the line B-C. When the shaft of valve V4 is moved, the table 10 rotates around the line A-C, and when the shaft of valve V5 is moved, the table 10 rotates around the line A-B. In this way, the five potential errors may be eliminated through appropriate measurement of the position of table 10 and operation of the valves V1–V5 in response to said measurement. Any suitable device known in the art may be used to measure the position of table 10.

It should be appreciated that the present invention is not limited by the above-described embodiments and that changes and modifications can be made by one ordinarily skilled in the art without deviation from the scope of the invention as defined below in the appended claims.

It should also be appreciated that features disclosed in the foregoing description, and/or the following claims, and/or in the accompanying drawings, and/or examples, and/or tables may, both separately and in any combination thereof, be material for realizing the present invention in diverse forms thereof.

While the valves V1–V5 have been described as being connected to an oil supply source, the valves in the unit of the present invention can be connected to a supply source having a different operating fluid such as air or water.

What is claimed is:

1. A device for correcting five errors in the movement of a sliding unit having at least three pads which comprises:

five valves in fluid communication with recesses associated with said at least three pads;

each of said valves having an inlet which communicates with a fluid source and two outlets communicating with at least two of said recesses; and each of said valves being independently operable to correct one of said errors.

2. A device according to claim 1, wherein said unit has four pads and a first one of said valves is connected to opposed recesses associated with a first pair of said pads for controlling rotational movement of said unit about a first point.

3. A device according to claim 2, wherein a second one of said valves is connected to opposed recesses associated with a second pair of said pads for controlling rotational movement of said movement about a second point.

4. A device according to claim 3, wherein a third one of said valves is connected to recesses associated with a third pair of said pads for controlling rotational movement of the unit about a first line connecting the centers of the recesses associated with a fourth pair of said pads.

5. A device according to claim 4, wherein a fourth one of said valves is connected to the recesses of a first one of said pads for controlling rotational movement of the unit about a second line extending between the center of the recesses of a second pad and the center of a third line extending between the center of the recesses of said third pair of pads.

6. A device according to claim 5, wherein a fifth one of said valves is connected to a second one of said pads to control rotational movement about a fourth line extending between the center of said recesses of said first one of said pads and said center of said third line.

7. The device according to claim 1, wherein said unit has three pads and wherein the outlets of a first one of said valves are connected to a first pair of recesses of a first one of said pads and the outlets of a second one of said valves are connected to a first pair of opposed recesses on a second one and a third one of said pads and a second pair of opposed recesses on said second one and said third one of said pads.

8. The device according to claim 7, wherein the outlets of a third one of said valves are connected to a second pair of recesses associated with said first one of said pads, a fourth one of said valves has its outlets connected to a second pair of recesses associated with said second one of said pads, and a fifth one of said valves has its outlets connected to a third pair of recesses associated with said third one of said pads.

9. A method for eliminating five errors which occur during linear movement of a sliding unit having at least three pads comprising:

providing five independently operable valves;

connecting each of said valves to at least one pair of recesses associated with at least one of said pads; and independently operating said valves to eliminate said errors.

10. A method according to claim 9 further comprising:

measuring deviations of said sliding unit from a linear path; and operating said valves in response to said measuring deviations.

* * * * *